Sept. 22, 1931.  J. B. GROSSWEGE  1,824,049
BRAKE AND POWER INTERLOCK
Filed July 13, 1929
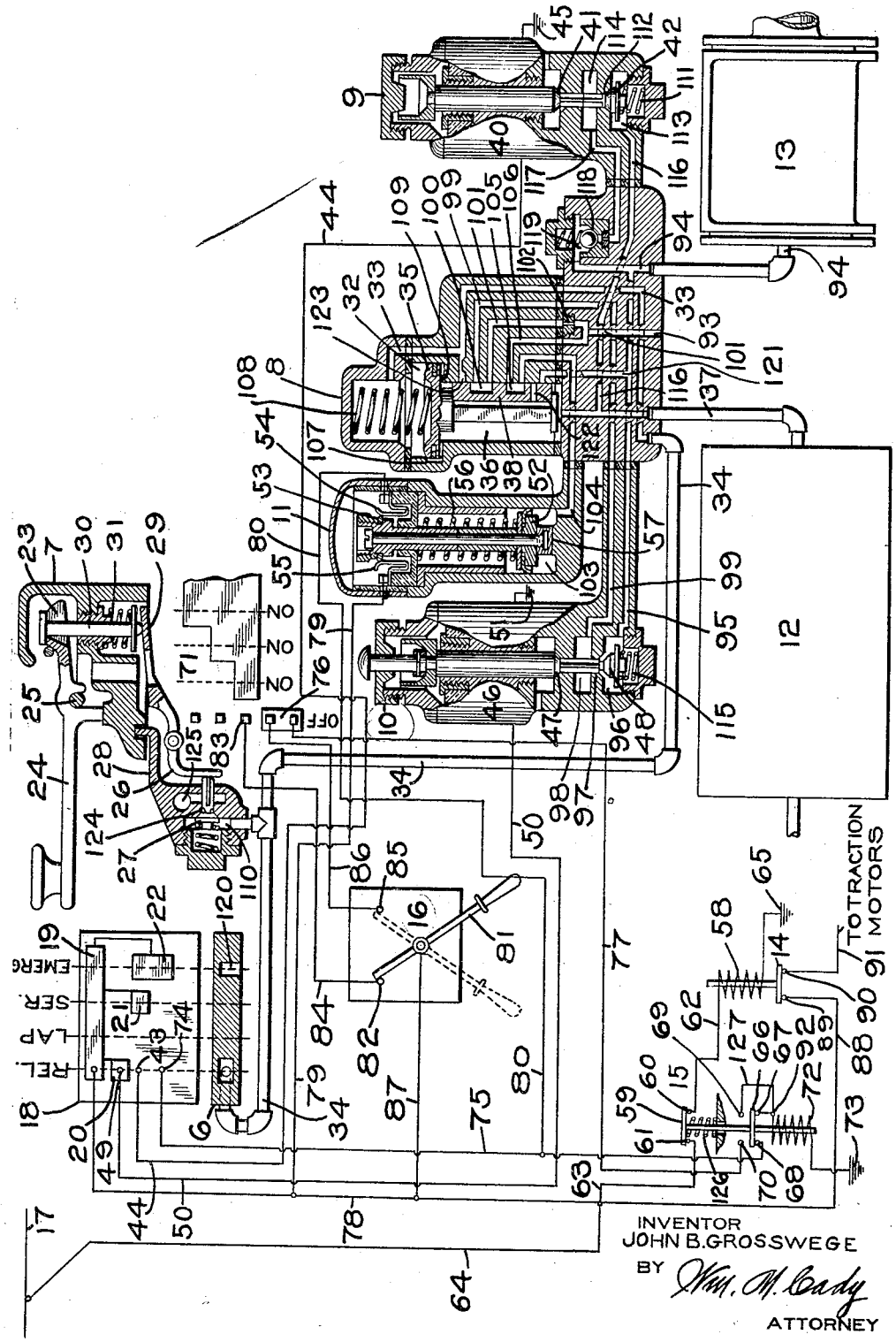
INVENTOR
JOHN B. GROSSWEGE
BY Wm. M. Cady
ATTORNEY Patented Sept. 22, 1931

1,824,049

UNITED STATES PATENT OFFICE

JOHN B. GROSSWEGE, OF EDGEWOOD, PENNSYLVANIA, ASSIGNOR TO THE WESTING-HOUSE AIR BRAKE COMPANY, OF WILMERDING, PENNSYLVANIA, A CORPORATION OF PENNSYLVANIA

BRAKE AND POWER INTERLOCK

Application filed July 13, 1929. Serial No. 377,940.

This invention relates to safety car equipment and more particularly to a brake and power interlock for electropneumatic safety car equipment.

One feature of the safety car equipment is that when an emergency application of the brakes is made when the operator removes his hand from the controller handle when the controller is in "power on" position, the main power circuit is opened so as to cut off power to the traction motors.

The circuit breaker, or line switch for the power circuit is usually installed underneath the car floor, and a pneumatically operated switch device for controlling a secondary circuit of the circuit breaker, is associated with the emergency valve of the equipment, so that when the emergency valve is actuated, the secondary circuit will be broken, thereby operating the circuit breaker to open the main power circuit.

As is well known with the electropneumatic safety car equipment, after a dead man's or controller handle emergency, the emergency valve returns to release position, and the pneumatically operated switch device is also closed.

Associated with the circuit breaker of the main power circuit, the electropneumatic safety car equipment may have a reset switch, which is located in the motorman's compartment.

Heretofore, so far as I am aware of, in the construction of electropneumatic safety car equipment of this type, no means have been provided for preventing the closing of the main power line circuit breaker or line switches, after a dead man's or controller handle emergency, while the controller is in "power on" position.

If, after a controller handle or dead man's emergency, the circuit breaker is closed while the controller is in a "power on" position, power will be supplied to the traction motors.

Therefore, in equipments of this type, it is of advantage to provide means by which the operator must first move the controller handle to "power off" position, before the reset switch is operated to effect the closing of the circuit breaker, after the power circuit has been broken by a dead man's or controller handle emergency.

An object of the invention is to provide an improved electropneumatic safety car equipment of the type having a manually controlled reset switch, in which means are provided for preventing the closing of the power circuit after a controller handle emergency until the controller handle is moved to "power off" position.

Another object of the invention is to provide a safety car equipment of the above type in which the power circuit is provided with an electrically operated circuit breaker adapted to automatically open the circuit when a controller handle emergency application of the brakes is effected and which can not be actuated to again close the circuit until the controller handle is moved to "power off" position before the reset switch is operated.

Another object of the invention is to provide an improved safety car equipment of the character mentioned which is relatively simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawing, the single figure is a diagrammatic view, mostly in section, of a safety car equipment embodying the invention.

Referring to the drawing, the equipment may comprise a brake valve device 6, an electric controller operating device 7, an emergency valve device 8, a service magnet valve device 9, a release magnet valve device 10, an interlock switch device 11, a main reservoir 12, a brake cylinder 13, a circuit breaker 14, a control device 15 for the circuit breaker, and a reset switch device 16. Current for operating the equipment may be supplied from any suitable source, such as a trolley wire 17.

The brake valve device 6 may be of any approved type adapted to control the application and release of the brakes through electrically and pneumatically operated means, and for this purpose the brake valve device is electrically connected with the service magnet valve device 9, the release magnet valve device 10, the interlock switch device 11, the circuit breaker 14 and the control device 15, and pneumatically connected with the controller operating device 7 and the emergency valve device 8, in the manner to be hereinafter more fully described. Formed as a part of the brake valve device, is an electric switch comprising a contact drum 18, shown developed, and having a plurality of contacts 19, 20, 21 and 22, the purpose of which will appear later on.

As shown, the electric controller operating device 7 may comprise a handle casing provided with a pocket within which the forked end 23 of a controller handle 24 is adapted to be inserted. The handle 24 is pivotally mounted on a transversely disposed pin 25 in such a manner as to be easily detached from or applied to the controller in the usual well known manner.

Disposed beneath the casing of the controller handle 24 is a bell crank lever having one arm 26 which is adapted to engage the stem of a pilot valve 27 mounted in a bracket 28 and another arm 29 which is adapted to be engaged by a plunger 30 mounted in the handle casing.

A coil spring 31 acts on the plunger 30 and tends to force the plunger into engagement with the arm 29 of the bell crank lever.

The prongs of the forked end 23 of the controller handle 24 are adapted to engage beneath the head of the plunger 30 when in operating position.

The emergency valve device 8 may comprise a casing having a piston chamber 32 connected through a passage 33 with a control pipe 34 and containing a piston 35 and a valve chamber 36 connected by passage and pipe 37 to the main reservoir 12 and containing a slide valve 38 adapted to be operated by piston 35.

The control pipe 34 leads to a chamber 39 in which the pilot valve 27 is contained, and said pipe is connected also to the brake valve device 6.

The service magnet valve device 9 may comprise a magnet 40 and valves 41 and 42 adapted to be controlled by said magnet. One terminal of the magnet 40 is connected to a contact 43 on the brake valve switch drum 18, by a conductor 44, while the other terminal of said magnet is connected to a ground 45.

The release magnet valve device 10 may comprise a magnet 46 and valves 47 and 48 adapted to be controlled by said magnet. One terminal of the magnet 46 is connected to a contact 49 on the brake valve switch drum 18, by a conductor 50, while the other terminal of said magnet is connected to a ground 51.

The interlock switch device 11 may comprise a hollow casing containing a piston 52, the stem of which is provided with a contact member 53 adapted to engage spring fingers 54 and 55 so as to normally close a circuit from the trolley wire 17 to the control device 15, in the manner to be described. A spring 56 acts on one side of piston 52 so as to normally maintain said piston in its outer position against a stop 57.

The circuit breaker 14 may comprise a switch member operated by a relay coil 58, which is normally maintained energized by current supplied through a second circuit from the trolley wire 17 controlled by a switch 59 of the control device 15.

Associated with switch member 59 and adapted to operate therewith, is another switch member 66, normally engaging contacts 67 and 68 in a circuit from the brake valve switch device and adapted to engage, in another position, contacts 69 and 70 in a circuit from the controller 71 (only a portion of which is shown developed).

The contacts 67 and 69 are connected to one terminal of a relay coil 72 adapted to operate the switch members 59 and 66, and the other terminal of said coil is connected to a ground 73.

The reset switch device 16 may comprise a switch member 81, adapted in one position, to engage a contact 82 connected to controller contact 83 by a conductor 84, and adapted in another position to engage a contact 85 connected to the controller contact 76, by a conductor 86.

With the brake valve device 6 in release position and the controller handle 24 depressed by the operator, as shown in the drawing, current from the trolley wire 17 will be supplied for operating the traction motors (not shown), through conductors 64 and 88, contact 89, circuit breaker switch 14, contact 90, and conductor 91.

The circuit breaker operating coil 58 is energized by current supplied from the trolley wire 17, through conductors 64 and 63, contact 61, switch member 59, contact 60, conductor 62 connected to one terminal of the coil 58, and from thence to ground 65.

Connected to the conductor 64, is a conductor 78, which is also connected to the drum contact 19 of the brake valve device 6. Therefore, with the interlock switch device 11 in the position shown in the drawing, the coil 72 of the control device 15 will be energized by current supplied through conductors 78 and 79, spring finger 55, contact member 53, spring finger 54, conductors 80 and 75, contact 68, switch member 66, contact 67, and conductor 92, connected to one terminal of the coil 72, and from the coil to the ground 73.

Current supplied to the conductor 78 will also pass through the contacts 19 and 20, and conductor 50 to the magnet 46 of the release magnet valve device 10, and to the ground 51, thereby energizing the release magnet. However, as the contact 43 will be separated from the contacts 21 and 22, magnet 40 of the service magnet valve device 9 will not be energized.

Magnet 46 being energized, the valve 47 will be held seated and valve 48 will be unseated, so that the brake cylinder 13 will be connected to exhaust port 93, through pipe and passage 94, passage 95, valve chamber 96, bore 97 containing the fluted stem of valve 48, chamber 98, passage 99, cavity 100 in the slide valve 38, and passage 101 containing a choke plug 102.

With the piston 35 of the emergency valve device 8 in release position, as shown, piston chamber 103 of the interlock switch device 11 will also be connected to the exhaust port 93, through passage 104, cavity 105 in the slide valve 38, and passages 106 and 101.

The valve chamber 36 of the emergency valve device 8 is charged from the reservoir 12, through pipe and passage 37, and the fluid supplied to piston chamber 32 is maintained at the same pressure by the usual feed groove 107. The pressures on opposite sides of piston 35 being equal, the spring 108 maintains the piston in engagement with stop 109.

Fluid under pressure will also be supplied from the piston chamber 32 through passage 33 and pipe 34, to the pilot valve chamber 110, and also to the brake valve device 6. As long as the controller handle 24 is manually held depressed, as shown in the drawing, the pilot valve 27 will be maintained seated by its spring, and the fluid under pressure will be bottled up in chamber 110.

Magnet 40 of the service magnet valve device 9 being deenergized, the spring 111, acting on the valve 42, seats said valve and unseats the valve 41, thereby cutting off the communication through bore 112, from chamber 113 to chamber 114.

When a service application of the brakes is made, the contact 20 is disconnected from the contact 49, thereby opening the circuit from the source of supply to the magnet 46 of the release magnet valve device 10. The magnet 46 will therefore be deenergized.

On the other hand, contact 43 will be connected with contact 21, thereby closing the circuit from the source of supply to the magnet 40 of the service magnet valve device 9, and therefore magnet 40 will be energized.

Deenergization of the magnet 46 permits the spring 115 to shift the valve 48 to its seat, thereby unseating the valve 47. With the valve 48 seated, the communication through which the brake cylinder 13 is vented to the atmosphere through the exhaust port 93, is cut off.

Energization of the magnet 40 seats the valve 41 and unseats the valve 42, and the fluid under pressure is permitted to flow from the reservoir 12, through pipe and passage 37, passage 116, chamber 113, past the open valve 42, and through bore 112, to chamber 114, and from thence to the brake cylinder 13, through passage 117, past ball check valve 118, in chamber 119, and passage and pipe 94.

When the desired pressure has been obtained in the brake cylinder, the brake valve device 6 is moved to lap position, in which the contact 43 is disconnected from the contact 21, thereby opening the circuit through which current is supplied to the magnet 40, so that the service magnet is deenergized. The spring 111, acting on the valve 42, seats said valve and unseats the valve 41, thus preventing the further supply of fluid under pressure to the brake cylinder 13. The release magnet 46 remains deenergized in lap position, so that fluid under pressure is prevented from being vented to the atmosphere.

When it is desired to release the brakes the brake valve device 6 is moved to release position, in which the contact 20 is engaged with contact 49, thereby closing the circuit from the source of supply to the release magnet 46, and causing the energization of said magnet.

Magnet 46 being energized, the valve 47 will be seated and the valve 48 unseated, as shown in the drawing. The fluid under pressure in the brake cylinder 13 will therefore exhaust to the atmosphere, through pipe and passage 94, passage 95, valve chamber 96, bore 97, chamber 98, passage 99, valve cavity 100, passage 101, and exhaust port 93, the choke plug 102 controlling the rate of blow down, as will be readily understood.

When it is desired to effect an emergency application of the brakes, the brake valve device 6 is moved to emergency position, in which the contacts 43 and 74 are connected with the contact 22, for the purpose to be hereinafter more fully described, and in which fluid from the pipe 34 is permitted to vent through the atmospheric opening 120 in the brake valve.

The venting of fluid from pipe 34 causes the emergency piston 35 to be shifted to its outer position by the fluid pressure in valve chamber 36 and the slide valve 38 is thus moved so as to uncover passage 121 and permit the supply of fluid under pressure from the reservoir 12 to the brake cylinder 13.

In emergency position, a port 122 through slide valve 38, registers with passage 104, so that fluid under pressure is supplied to piston 52 of the interlock switch device 11.

Said piston is then shifted so as to disconnect the contact 53 from the spring fingers 54 and 55. In this way the circuit through the conductor 75 to the relay coil 72 will be opened. Since in the emergency position of the brake valve device 6, the circuit of release magnet 46 will be opened, said magnet will be deenergized.

While the circuit to the relay coil 72 is opened at the interlock switch device 11, when an intentional emergency application of the brakes is effected, the circuit to said coil is closed at the brake valve device 6, since the contacts 43 and 74 engage the contact 22 in the emergency position of the brake valve device. Therefore, under the above condition, the relay coil 72 is maintained energized in all positions of the brake valve device, since the interlock switch device 11 is maintained closed except when a manual emergency application of the brakes is effected, while in the emergency position of the brake valve device 6, current will be supplied from the conductor 78 to the conductor 75 by contacts 19 and 22.

To release after an emergency application of the brakes, the brake valve device 6 is returned to release position. In this position, the release magnet 46 is energized through the conductor 50.

The release magnet being energized, the valve 48 is unseated and the brake cylinder passage 95 is connected to passage 99. With the emergency slide valve 38 in emergency position, passage 121 leading from the brake cylinder 13, is open to the valve chamber 36, so that fluid under pressure is supplied from the reservoir 12 to passage 95 and thus to passage 99. Passage 99 is connected in emergency position of the slide valve 38, through cavity 100 with passage 123 leading from passage 33. Since passage 33 leads to pipe 34, said pipe will also be charged with fluid under pressure. When the pressure in piston chamber 32 has been increased to a predetermined degree, the spring 108 shifts the piston 35 to release position, in which the brake cylinder 13 is connected to the exhaust port 93, as hereinbefore described.

When the emergency slide valve 38 is shifted to release position, piston chamber 103 of the interlock switch device 11 will also be connected to the exhaust port 93, through passage 104, valve cavity 105 and passages 106 and 101, and as the pressure reduces in said piston chamber, the spring 56 shifts the piston 52 to the release position, in which position the circuit through conductors 79 and 80 from conductor 78 to conductor 75 is again closed.

As long as the operator holds the controller handle 24 down in the position shown in the drawing, the operation will be the same as that of the usual controller and the circuit breaker 14 will remain closed so as to permit the supply of current through the main power circuit to the traction motors.

If, when the brake valve device 6 is in any position except its emergency position, the operator releases the controller handle 24, the spring 31 will immediately act to shift the plunger 30 downwardly, thereby causing the arm 26 of the bell crank lever to open the pilot valve 27.

With the pilot valve 27 unseated, the fluid under pressure in piston chamber 32 is vented to the atmosphere through passage 33, pipe 34, pilot valve chamber 110, bore 124, and exhaust port 125.

The venting of fluid from the piston chamber 32 causes the emergency piston 35 to be shifted to its outer position by the fluid pressure in valve chamber 36 and the slide valve 38 is thus moved so as to uncover passage 121 and permit the supply of fluid under pressure from the reservoir 12 to the brake cylinder 13, thereby effecting an application of the brakes.

With the piston 35 in emergency position, chamber 103 of the interlock switch device 11 will be supplied with fluid under pressure in the manner hereinbefore described, and therefore piston 52 will be shifted so as to disconnect the contact 53 from the spring fingers 54 and 55, and thus open the circuit to the relay coil 72 of the control device 15.

With the relay coil 72 thus deenergized, spring 126, acting on the switch member 59, disengages said switch member from the contacts 60 and 61, and simultaneously disengages the switch member 66 from contacts 67 and 68 and engages said switch member 66 with contacts 69 and 70 of the circuit from the controller contact 76.

When the switch member 59 is thus disengaged from contacts 60 and 61, the circuit through conductor 62 is opened, thereby causing the deenergization of the circuit breaker operating coil 58.

Deenergization of the coil 58 causes the circuit breaker 14 to become disconnected from the contacts 89 and 90, so as to open the main power circuit through conductor 91 to the traction motors (not shown).

According to the present invention, in order to close the circut breaker 14, so as to again have power available at the traction motors, and assuming that the brake valve device 6 is in release position, it is first necessary for the operator to return the controller handle 24 to the "power off" position, and to then depress said controller handle, as shown in the drawing, so as to seat the pilot valve 27, and thus close the atmospheric vent from the pipe 34.

With the pilot valve 27 seated, and with the emergency slide valve 38 in emergency position, passage 121 leading from the brake cylinder 13, is open to the valve chamber 36, so that fluid under pressure is supplied from the reservoir 12 to passage 95 and thus to passage 99. Passage 99 is connected in emergency position of the slide valve 38, through cavity 100 with passage 123, so that the piston chamber 32 is charged with fluid under pressure through passage 33 leading from passage 123. Since passage 33 leads to pipe 34, said pipe will also be charged with fluid under pressure, as has been previously described. When the pressure in piston chamber 32 has been increased to a predetermined degree, the spring 108 shifts the piston 35 to release position, in which the brake cylinder 13 is connected to the exhaust port 93.

When the emergency slide valve 38 is shifted to release position, piston chamber 103 of the interlock switch device 11 will also be connected to the exhast port 93, through passage 104, valve cavity 105 and passages 106 and 101, and as the pressure reduces in said piston chamber, the spring 56 shifts the piston 52 to the release position, in which position the contact 53 engages the spring fingers 54 and 55, thereby closing the circuit through conductors 79 and 80 from conductor 78 to conductor 75.

However, since the switch member 66 is out of engagement with the contacts 67 and 68, the circuit through the relay coil 72 will remain open, and accordingly said relay coil will not be energized.

With the controller handle 24 depressed as shown in the drawing, and also in "power off" position, the operator can now shift the position of the reset switch member 81 so that said member engages contact 85 and closes the circuit from the conductor 78, through conductor 87, to conductor 86, and thence through the controller contact 76, to conductor 77.

Since the switch member 66 is in engagement with the contacts 69 and 70, the circuit to the relay coil 72, from conductor 77 to conductor 127 which is connected to conductor 92, will be closed, and therefore said relay coil will be energized.

Relay coil 72 now being energized, the switch member 66 is moved out of engagement with the contacts 69 and 70, and moved into engagement with the contacts 67 and 68, and this action causes the switch member 59 to engage the contacts 60 and 61, thus closing the circuit through conductor 62 from conductor 63, to the circuit breaker operating coil 58, and thence to ground 65, thereby energizing the coil 58.

With the circuit breaker operating coil 58 now energized, the circuit breaker 14 will be moved into engagement with the contacts 89 and 90, thereby closing the circuit from the conductors 64 and 88 to the main traction motor conductor 91.

After the switch member 66 has been disconnected from the contacts 69 and 70 and has moved into engagement with the contacts 67 and 68, current will be supplied through the conductor 75 for the purpose of maintaining the relay coil 72 energized in the manner heretofore described. The reset switch member 81 can be now moved from the dotted line position shown in the drawing, to the full line position shown, since the circuit through the controller contact 76 is no longer needed, as will be readily understood. With the circuit through the controller contact 76 thus opened at the reset switch device 16, the controller handle 24 can now be moved from "power off" position, to the "power on" positions for the usual purpose of controlling the supply of current to the traction motors.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In combination with the power circuit of safety car equipment, a controller handle, a circuit breaker, a double switch device for controlling the operation of said circuit breaker, one portion of said switch device being adapted in one position to close one circuit and being adapted to another position to close a second circuit connected with the "power off" position of the controller handle, the other portion of said switch device being adapted to close the circuit by which the circuit breaker is operated, and means operative only in the "power off" position of the controller handle for temporarily controlling the second circuit.

2. In a safety car equipment, the combination with a brake cylinder, main reservoir, emergency valve, power circuit, and controller handle, of electrically operated means for opening the power circuit when the controller handle is released by the operator when said handle is in running position, comprising a switch and means controlled by the emergency valve for opening said switch when said valve is actuated, and a manually operated switch for controlling a temporary circuit through which said eletrical means are operated to close the power circuit only when the emergency valve returns to release position and the controller handle is moved to its "power off" position.

3. A vehicle power circuit controlling apparatus comprising a switch for controlling the power circuit, an electromagnet for operating said switch, a second switch for controlling the circuit of said magnet, an electro-magnet for controlling said second switch, and a manually operated switch having one position for closing the power circuit and another position for closing the circuit of said second magnet.

4. A vehicle power circuit controlling apparatus comprising a switch for controlling the power circuit, an electro-magnet for operating said switch, a second switch for controlling the circuit of said magnet, an electro-magnet for controlling said second switch, a power controller for closing the circuit of said second magnet in the off position, and a manually operated switch for also controlling the power circuit and having a position for closing the circuit of said second magnet.

5. In a safety car equipment, the combination with a fluid pressure brake system including an emergency valve, power circuit and controller handle, of a circuit breaker, means controlled by the emergency valve for operating the circuit breaker to open the power circuit when the operator releases the controller handle when said handle is in a "power on" position, and a manually operated device for controlling the closing of the circuit breaker only when the controller handle is in "power off" position.

6. In a safety car equipment, the combination with a fluid pressure brake system including an emergency valve, power circuit and controller handle, of a circuit breaker, means controlled by the emergency valve for operating the circuit breaker to open the power circuit when the operator releases the controller handle when said handle is in a "power on" position, and a reset switch device for controlling the closing of the circuit breaker only when the controller handle is in "power off" position.

7. In a safety car equipment, the combination with a fluid pressure brake system including an emergency valve, power circuit and controller handle, of a circuit breaker, electrically operated means controlled by the emergency valve for automatically operating the circuit breaker to open the power circuit when the operator releases the controller handle when said handle is in "power on" position, and a manually operated switch device for closing a circuit through which the circuit breaker is operated to close the power circuit only when the controller handle is in "power off" position.

8. In a safety car equipment, the combination with a fluid pressure brake system including an emergency valve, power circuit and controller handle, of a circuit breaker, normally energized electrical means for maintaining the circuit breaker closed, a double switch device controlled by the emergency valve for controlling the circuit through which said electrical means is energized, said double switch device being operated to open said electrical means circuit when the operator releases the controller handle when said handle is in a "power on" position whereby said circuit breaker is operated to open the power circuit, and manually operated means for closing the circuit through which said double switch device is actuated to close said electrical means circuit only when the controller handle is in "power off" position.

9. In a safety car equipment, the combination with a fluid pressure brake system including an emergency valve, power circuit and controller handle, of a circuit breaker, a double switch device controlled by the emergency valve for controlling the operation of said circuit breaker, one portion of said switch device being adapted in one position to close one circuit and being adapted in another position to close a second circuit connected with the "power off" position of the controller handle, the other portion of said switch device being adapted to close the circuit by which the circuit breaker is operated, and means operative only in the "power off" position of the controller handle for temporarily controlling the second circuit.

10. In a safety car equipment, the combination with a fluid pressure brake system including an emergency valve, an electric circuit having a circuit breaker and a controller handle, of means controlled by the emergency valve for opening the circuit breaker when the operator releases the controller handle when said handle is in a "power on" position, and manually operated circuit controlling means for effecting the closing of the circuit breaker only when the controller handle is returned to its "power off" position.

11. In a brake and power interlock device, a power circuit, a brake system, a controller handle, a circuit breaker, means controlled by the brake system and operated upon an emergency application of the brakes for opening the circuit breaker when the controller handle is in a "power on" position, and a manually operated switch device for temporarily closing a circuit through which the circuit breaker is closed only when the controller handle is returned to its "power off" position.

12. In a brake and power interlock device, a power circuit, a fluid pressure brake system including an emergency valve, a controller handle, a circuit breaker, means controlled by the emergency valve and operated upon an emergency application of the brakes for opening the circuit breaker when the controller handle is in a "power on" position, and a manually operated switch device for temporarily closing a circuit through which the circuit breaker is closed only when the controller handle is in "power off" position.

13. Safety car equipment comprising a power circuit, a controller handle, a fluid pressure brake system including an emergency valve, means controlled by the emergency valve for controlling the power circuit whereby said power circuit is opened when the operator releases the controller handle when said handle is in a "power on" position, and a reset switch device controlling a temporary circuit through which said power circuit controlling means are operated to close said power circuit only when the controller handle is in "power off" position.

14. Safety car equipment comprising a power circuit, a controller handle, a brake system including an emergency valve, normally energized electrical means controlled by the emergency valve for controlling the power circuit whereby said power circuit is opened when the operator releases the controller handle when said handle is in a "power on" position, and a manually operated switch device for controlling a circuit through which said electrical means are operated to close said power circuit only when the controller handle is in "power off" position.

15. In a brake and power interlock, the combination with a brake system including an emergency valve, a power circuit and a controller handle, of electrically operated means controlled by said valve for automatically opening the circuit when the controller handle is released by the operator when said handle is in a "power on" position, and a manually operated switch device for closing a temporary circuit through which said electrically operated means are actuated to close the power circuit when the controller handle is returned to "power off" position.

16. In a safety car equipment, the combination with a brake system including an emergency valve, a power circuit and a controller handle, of normally energized electrical means controlled by said valve for maintaining the circuit closed, and adapted to be deenergized when the controller handle is released by the operator when said handle is in a "power on" position and open the circuit, and a reset switch device for closing a circuit through which said electrical means are energized to close the power circuit when the controller handle has been moved to its "power off" position.

17. Safety car equipment comprising a fluid pressure brake system including an emergency valve, a power circuit, a controller, a controller handle, a switch device adapted to control a circuit through a "power on" position of the controller and also adapted to control a second circuit through the controller when the controller handle is in its "power off" position, and means controlled by said valve for maintaining the power circuit closed and adapted to be automatically operated to open the power circuit when the controller handle is released by the operator when said handle is in a "power on" position and adapted to be operated to close the power circuit only when said switch device is set to close the above-mentioned second circuit and the controller handle is moved to "power off" position.

In testimony whereof, I have hereunto set my hand, this 10th day of July, 1929.
JOHN B. GROSSWEGE.